US012752497B2

(12) United States Patent
Huttunen et al.

(10) Patent No.: US 12,752,497 B2
(45) Date of Patent: Oct. 6, 2026

(54) METHOD FOR MANUFACTURING FIBER REINFORCED ARTICLE AND APPARATUS

(71) Applicant: ARCTIC BIOMATERIALS OY, Tampere (FI)

(72) Inventors: Mikko Huttunen, Tampere (FI); Vesa Vuorisalo, Tampere (FI); Harri Heino, Tampere (FI)

(73) Assignee: ARCTIC BIOMATERIALS OY, Tampere (FI)

( * ) Notice: Subject to any disclaimer, the term of this patent is extended or adjusted under 35 U.S.C. 154(b) by 536 days.

(21) Appl. No.: 18/255,091

(22) PCT Filed: Nov. 30, 2020

(86) PCT No.: PCT/EP2020/083887
§ 371 (c)(1),
(2) Date: May 30, 2023

(87) PCT Pub. No.: WO2022/111826
PCT Pub. Date: Jun. 2, 2022

(65) Prior Publication Data

US 2024/0001630 A1 Jan. 4, 2024

(51) Int. Cl.
*B29C 70/46* (2006.01)
*B29C 43/36* (2006.01)
(Continued)

(52) U.S. Cl.
CPC .......... *B29C 70/46* (2013.01); *B29C 43/3607* (2013.01); *B29C 43/361* (2013.01);
(Continued)

(58) Field of Classification Search
CPC ......... B29C 70/46; B29C 43/36; B29C 43/52; B29C 35/02; B29C 70/14; B29C 43/3607;
(Continued)

(56) References Cited

U.S. PATENT DOCUMENTS 4,208,174 A 6/1980 Taricco
5,529,736 A * 6/1996 Shalaby ................ A61B 17/68
264/348

(Continued)

FOREIGN PATENT DOCUMENTS

CN 1168105 12/1997
CN 1593356 3/2005

(Continued)

OTHER PUBLICATIONS

Jan. 11, 2025 Office Action issued in Chinese Patent Application No. 202080107444.9, pp. 1-6.

(Continued)

*Primary Examiner* — Alison L Hindenlang
*Assistant Examiner* — Shibin Liang
(74) *Attorney, Agent, or Firm* — Nixon & Vanderhye PC

(57) ABSTRACT

A method of forming a fiber reinforced article comprising following steps: 101) providing a composite preform comprising of thermoplastic polymer matrix and reinforcing fibers, wherein the preform comprises an initial volume and initial fiber orientation, 102) loading the preform inside a radial molding apparatus comprising of at least three adjacent die segments next to each other forming a mold cavity in an initial position having an initial volume, 103) molding the preform by moving the die segments, which are in direct contact with each other during the initial position and movement and a compressed position, and which are perpendicular to a common longitudinal axis of the preform, wherein the initial volume of the mold cavity decreases and the die segments compress the preform to a form defined by the mold cavity in the compressed position having a final volume, which is smaller or equal to the initial volume of the preform, 104) opening the mold cavity, and 105) removing the obtained fiber reinforced article, which comprises a (Continued)

tailored fiber orientation, from the mold cavity, wherein the continuous reinforcing fibers follow to a surface contour of said article.

12 Claims, 7 Drawing Sheets

(51) Int. Cl.

| | |
|---|---|
| ***B29C 43/52*** | (2006.01) |
| ***B29C 45/00*** | (2006.01) |
| ***B29C 70/14*** | (2006.01) |
| ***B29K 105/00*** | (2006.01) |
| ***B29K 105/14*** | (2006.01) |
| ***B29L 1/00*** | (2006.01) |
| ***B29L 31/00*** | (2006.01) |

(52) U.S. Cl.

CPC .......... *B29C 43/52* (2013.01); *B29C 45/0005* (2013.01); *B29C 45/0055* (2013.01); *B29C 70/14* (2013.01); *B29C 2043/3602* (2013.01); *B29C 2043/3615* (2013.01); *B29K 2105/14* (2013.01); *B29K 2105/253* (2013.01); *B29L 2001/007* (2013.01); *B29L 2031/753* (2013.01)

(58) Field of Classification Search

CPC .......... B29C 43/361; B29C 2043/3602; B29C 70/42; B29C 43/02; B29K 2105/253

See application file for complete search history.

(56) References Cited

U.S. PATENT DOCUMENTS

| | | | | |
|---|---|---|---|---|
| 5,981,619 A * | 11/1999 | Shikinami | A61L 31/148 525/450 |
| 7,448,243 B1 * | 11/2008 | Motsenbocker | B21J 7/16 72/402 |
| 8,043,553 B1 | 10/2011 | Durcan | |
| 2005/0150444 A1 | 7/2005 | Sung | |
| 2007/0141111 A1 | 6/2007 | Suokas et al. | |
| 2013/0218214 A1 * | 8/2013 | Beyar | A61B 17/8057 606/305 |
| 2014/0271768 A1 | 9/2014 | Radisch et al. | |
| 2015/0032167 A1 | 1/2015 | Heino et al. | |
| 2016/0243732 A1 | 8/2016 | Wissler et al. | |
| 2017/0087620 A1 | 3/2017 | Goff et al. | |
| 2018/0244006 A1 | 8/2018 | Greydanus et al. | |

FOREIGN PATENT DOCUMENTS

| | | |
|---|---|---|
| CN | 106620895 | 5/2017 |
| CN | 108633252 | 10/2018 |
| EP | 0373294 A2 | 6/1990 |
| EP | 1506882 A1 | 2/2005 |
| JP | 49-44068 | 4/1974 |
| JP | 02-16040 | 1/1990 |
| JP | 2017-003091 | 1/2017 |
| WO | 2008/116203 | 9/2008 |

OTHER PUBLICATIONS

International Search Report and Written Opinion of the ISA for PCT/EP2020/083887 mailed Nov. 10, 2021, 18 pages.

International Preliminary Report on Patentability for PCT/EP2020/083887 mailed Nov. 10, 2022, 17 pages.

Jul. 30, 2024 Office Action issued in Japanese Patent Application No. 2023-532820, pp. 1-3 [machine translation included].

* cited by examiner

METHOD FOR MANUFACTURING FIBER REINFORCED ARTICLE AND APPARATUS

CROSS-REFERENCE TO RELATED APPLICATION

This application is the U.S. national phase of International Application No. PCT/EP2020/083887 filed Nov. 30, 2020, which designated the U.S., the entire contents of which are hereby incorporated by reference.

TECHNICAL FIELD

The present invention relates to an apparatus and a method of manufacturing a fiber reinforced article, and more particularly to a fiber reinforced article having a tailored multidirectional fiber orientation.

BACKGROUND ART

Composite materials, also referred to as composites, are a combination of two or more materials that are mixed or joined on a macroscopic level. They are used in engineering applications where a pure material cannot provide the specific set of properties that are required. They can be thought of as a single material that has been enhanced by the addition of another material.

Fibers are added as a means of reinforcement and provide strength, stiffness, or any other desired property to the composite. One of the problems associated with the above arrangement is how to preserve the desired multidirectional fiber orientation of a complex-shaped article during the manufacturing phase.

SUMMARY

An object of the present invention is thus to provide a method to solve the above problems related to manufacturing the articles with desired fiber orientations. The desired fiber orientation may be just a simple uniaxial orientation or complex multilayer multidirectional orientation depending on the end product requirements. The objects of the invention are achieved by a method and an apparatus which are characterized by what is stated in the independent claims. The preferred embodiments of the invention are disclosed in the dependent claims.

The invention is based on the idea of using radial molding and forming a fiber reinforced article, which comprises a tailored fiber orientation, from the mold cavity, wherein the continuous reinforcing fibers follow to a surface design of said article.

BRIEF DESCRIPTION OF THE DRAWINGS

In the following the invention will be described in greater detail by means of preferred embodiments with reference to the attached drawings, in which.

DETAILED DESCRIPTION OF EMBODIMENTS

Figure 1:
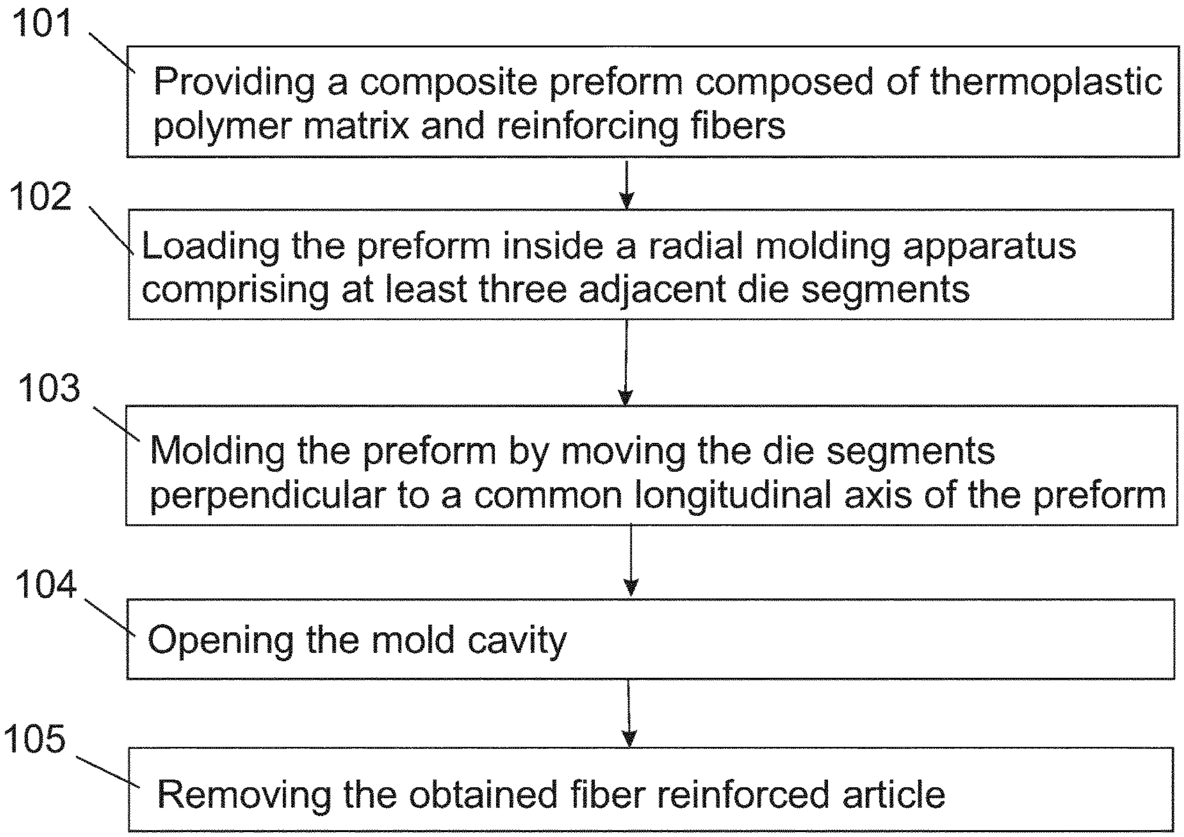
FIG. 1 is a flow chart of a method according to an embodiment.

This invention is focused on fiber reinforced thermoplastic polymer composites, which can be especially used in medical devices such as bone screws and fasteners. Said medical devices are usually made of stainless steel or titanium alloys. However, these materials tend to have certain challenges, such as mechanical mismatch with mechanical properties of bone tissue which may cause further challenges such as stress shielding. Metallic implant may also cause disturbance in imaging such as in MRI. This has led engineers to search for alternative materials which can meet the desired effects and properties.

One of the alternatives is the fiber reinforced polymer composite. This type of composites is composed of a combination of reinforcing fibers, and a thermoplastic polymer matrix material, that surrounds the fibers. Fibers add strength and stiffness to an otherwise viscoelastic polymer that, without reinforcement, lacks the mechanical properties needed in certain applications. Fibers and matrix work together in synergy providing a composite material with characteristic properties benefiting from the contribution of both elements.

Fibers are added as a means of reinforcement and provide strength, stiffness, or any other desired property to the composite. The matrix bonds the fibers together, protects the fibers from damage, and distributes the load from one fiber to another. The properties of the composite are determined by the properties of the fibers, their length, diameter, orientation, and amount, as well as the properties of the matrix, and the bonding between the matrix and the fibers. When using reinforcing fibers, the fibers can be chopped and/or continuous.

When the continuous fibers are aligned, they provide maximum strength along the direction of alignment. The composite can be considerably weaker along other directions and can therefore be highly anisotropic. This anisotropy can be overcome by fibers aligned in desired directions, i.e. fiber orientations.

One of the problems associated with the above arrangement is how to preserve the desired fiber orientation of a complex-shaped article during the manufacturing phase. On laminated planar structures this can be easily overcome by aligning fibers on desired fiber orientations on distinct layers or by selecting pre-manufactured sheets with desired fiber orientations. If the fiber reinforced article being manufactured is a simple rotationally symmetrical object the desired fiber orientation can be achieved by means of filament winding. On more complex shapes the desired fiber orientation may be manufactured by means of automatic composite manufacturing techniques, such as automatic tape placement and/or automatic fiber placement. If, however, the complex fiber orientation is to be manufactured on small size products which need to be mass produced on large quantity on industrial scale, the preferable manufacturing techniques include compression molding and injection molding.

During the conventional compression moulding, the fiber orientation of a preform changes or it is considerably challenging to preserve on certain geometry articles. Preserving the desired fibre orientation on planar structures is somewhat straightforward, but more complex geometries are not that easy to reproduce with predictable fibre orientation. For example, when compression molding a rotationally symmetrical solid object, the shape transformation of a preform is not uniform along the surfaces of the object when compressing the preform to mold defining the final shape of the article. Thus, the initial fiber orientation of preform distort, shuffle and/or disarrange at different amounts on different sections due to non-uniform shape transformation.

On injection molding the desired fiber orientation of the article being manufactured can be achieved by using an insert containing the fibers having desired fiber orientation. The insert is placed inside the mold defining the final shape of the article before injecting the matrix polymer which fills the mold. The largest outer dimensions of the insert need to be smaller than the smallest outer dimensions of the mold, because otherwise the fiber insert would squeeze on between the mold parts when the mold closes making the injection molding impossible.

The present invention relates to a continuous fiber reinforced structure forming method, which utilizes radial molding. Continuous fiber reinforced structure obtained by this method for certain product geometries can comprise a layer structure with defined fiber orientation on each layer which can be tailored having desired properties. Using conventional methods such as compression molding, such layer structure and/or fiber orientation tends to shuffle and disarrange during the molding, which causes the desired properties of the finished product to weaken and on some occasion, even render it useless. Using radial molding, the construction/structure of desired fiber orientation of final product can be tailored/predicted as the shape transformation during the mold closing is uniform radially surrounding the longest dimension of the preform. Ideally the fiber orientation structure can even remain unchanged in the finished product, which maximizes benefits of the desired properties. Such properties can be, for example, toughness, stiffness, or any other desired mechanical property.

FIG. 1 illustrates a flow chart of a method of forming a fiber reinforced article according to an embodiment. The first step 101 comprises providing a composite preform composed of thermoplastic polymer matrix and reinforcing fibers, wherein the preform comprises an initial volume and initial fiber orientation. The preform may be rotationally symmetrical and comprise an intermingled or interlocked layer structure, which would be preserved in the finished article. The preform may also comprise a tailored fiber structure, on which the fibers are initially located in separate and superimposed layers, and on which there are designed gaps on fiber structure on undermost layers and extra fibers on layers above the layers having gaps. These extra fibers on topmost layers may be located on the same position as the gaps on undermost layers. Thus, when radially compressing the preform, the extra fibers on topmost layers move to direction of the core and fill the gaps and the fiber structure of final product is 3D intermingled or interlocked structure, which is created during the radial molding phase. Each layer may consist of same or different material, and additionally may comprise a helix orientation having a desired angle such as 90°, 45° or 30°, for instance. The preform may consist of a core or insert wrapped around multiple layers having different helix, uniaxial, etc. orientation. In some structures, there may be gaps between different layers which would further facilitate interlocking the fibers in the finished article.

The thermoplastic materials are materials which shape can be transformed when heating them to certain material specific temperatures (e.g. glass transition temperature, melting temperature, etc.). Certain material properties, such as degree of crystallinity, strength properties, etc., of thermoplastic polymers may also be altered as a function of temperature and time. When thermoplastics are heated to certain temperature (glass transition temperature Tg), they soften, and their shape can be transformed. Semi-crystalline and crystalline thermoplastic polymers melt when they are heated to their melting point (Tm) or above melting point. Amorphous thermoplastic polymers do not have a melting point. Usually thermoplastic polymers are molded on temperatures above the Tg or above the Tm. They solidify to a glassy state when cooled below their glass transition temperature. There are many different types of fibers that can be used to reinforce polymer matrix composites. The most common are carbon fibers (AS4, IM7, etc.) and fiberglass (S-glass, E-glass, etc.). Fibre preforms are often manufactured in sheets, continuous mats, tubular structures or as continuous filaments or continuous filaments/tapes impregnated using matrix polymer.

The second step 102 comprises loading the preform inside a radial molding apparatus, either manually or automatically by a machine. Said radial molding apparatus comprises at least three adjacent die segments next to each other forming a mold cavity having an initial volume in an initial position and a final volume in a compressed position, which is smaller than the initial volume. The final volume of the mold cavity also defines a final volume and shape of the finished fiber reinforced article.

Each die segment can be identical, such as wedge-shaped with planar surfaces, which are arranged to form an approximately cylindrical central cavity. However, other shapes can also be formed depending on the design of the cavity surface. The wedges can be hinged and driven in unison to change the diameter, and consequently the volume, of the cavity. The die segment can have any design comprising two adjacent sides forming a 120° or less angle.

The third step 103 comprises molding the preform by moving said die segments. Each die segment is in direct contact with each other during end positions and movement of the mold, such as opening and closing as well as during the initial and compressed position. During this step, the compression applies similar or identical radial force and deformation towards the longitudinal axis of the preform.

Radial molding is a technique where the molded article is formed by a moldable continuous fiber reinforced preform material from the initial volume to the final volume along a plurality of radial directions. These radial directions are substantially perpendicular to a common longitudinal axis and arranged to lie in different planes. In this context the common longitudinal axis refers to the axis along which preform is loaded and perpendicular to the compression.

The said movable radial die segments are movable concurrently between the initial position and the final compression position which respectively define said initial volume and said final volume. The volume of the mold cavity in the compressed position can be smaller than or equal to the volume of the preform. Additionally, the volume of the preform can be smaller than the volume of the mold cavity in the initial position, and transverse dimension of the preform in the initial position can be larger than the transverse dimension of finished article in the compressed position. The transverse dimension of the preform in the initial position can also be smaller than or equal to the transverse dimension of the finished article in the compressed position, wherein the preform is additionally compressed from an end along the common longitudinal axis of the preform.

Linear or curved path actuators can be used to move said die segments between their initial and compressed positions. The said radial die segments can move along either linear or curved paths during which the interface surfaces on between the adjacent radial die segments can be then either linear or curved.

The radial mold comprised of at least three mold die segments described in this invention may also be used as a mold for injection molding. In injection molding the mold which opens radially, as described in this invention, enables to use continuous fiber inserts which have even larger initial diameter than the molded final product. With conventional mold there are always gaps on between the mold parts, also known as dies, when the mold opens and thus the use of such larger diameter inserts would be impossible, as the insert would get squeezed between the mold parts when the mold closes. If the mold opens and closes radially as explained in this invention such squeezing will not happen. This enables to use such continuous fiber reinforced inserts in overmolding injection molding which are impossible to use when using any other type of molds in injection molding.

The fourth step 104 comprises opening the mold cavity, by returning the die segments to the initial position, wherein each die segment is in direct contact with adjacent die segments during the movement. Both compression and release movements can be actuated by actuators to forcedly move said die segments between their initial and compressed positions. Said actuator can be hydraulic power cylinder, for instance, attached to the die segments. Operation of the die segments can be controlled by a valve. The power cylinders can be simultaneously connected to compress and, after compression, to reverse flow through the valve.

The fifth step 105 comprises removing the obtained fiber reinforced article from the mold cavity, either manually or automatically by a machine. The finished article comprises a tailored orientation and layer structure, wherein the continuous reinforced fibers follow or conform to a surface contour of said article. The initial fiber orientation structure can even remain unchanged in the finished article, which maximizes benefits of the desired properties. The obtained article comprises desired properties such as better toughness, as well as compression, torsion, impact resistance, or any other desired property.

In another embodiment, the method further comprises a heating step, wherein the preform is heated to above the glass transition temperature or melting temperature of matrix polymer. Heating the preform facilitates formability of the preform. Said heating step can be arranged inside the radial molding apparatus before the molding step or before loading the preform inside the radial molding apparatus. In some embodiments, the die segments can be heated using heating elements placed inside the desired locations in the compression die body and transfer the heat to the preform located in mold cavity. The preform is then cooled down inside the mold cavity by conduction or the finished article is cooled down after the molding step by any suitable cooling means such as air cooling.

In yet another embodiment, before or after or during the molding step, the method further comprises sliding at least one piston inside the mold cavity along the common longitudinal axis of the preform to further facilitate the compression of the preform by sealing the mold cavity from at least one end. In this context, the piston refers to any rod or stick or similar arranged to fit and move inside the molding apparatus. For example, one piston on each longitudinal end of the mold cavity can be provided, and during molding step, said pistons slide towards the preform and thus further compresses the preform from both ends. With the combination of the mold segments and the pistons all sides of the product can be formed. Preferably the pistons slide towards the preform after the die segments are moved to final compression position. A separate actuator may move the piston or both pistons. The piston may comprise a feature penetrating the whole mold cavity from one piston to another piston. Such embodiment is beneficial particularly when molding parts which have hollow opening trough the longest dimension of part. An example of such part is a cannulated screw.

A distal end of the piston may comprise a mold with an inverse design which is reproduced at an end portion of the obtained fiber reinforced article. The mold can be made of plastic such as polyetheretherketone (PEEK), which has excellent mechanical and chemical resistance properties that are maintained at high temperatures. The distal end in this context refers to the end contacting the preform. The design can be for instance a screw head and/or screw tip. On another embodiment the piston can include a separate part which is used as an insert and which is joined to the part being manufactured during the radial molding phase. Such insert is temporarily attached to piston prior to compression molding phase and it is permanently attached to the part being radial molded during the molding phase. Such insert may be composed of same material as part being manufactured or it may be composed of different material such as a metal, ceramic, etc. Such insert may comprise the whole tip of the part being manufactured. Such tip can be for instance threaded and used in applications where a mixture of two or more materials is more advantageous.

In yet another embodiment, the preform is provided in a continuous manner by loading and compressing the preform, returning the die segments and removing the obtained fiber reinforced article in such way that the preform is moved equally or less than the length of the mold cavity in the direction of the common longitudinal axis without separating the preform and the obtained fiber reinforced article from each other. The loading can be performed automatically or manually. When automated the actuator may move the preform to mold cavity on continuous manner explained below:

Continuous Process:

1. starting the process by loading continuous preform to a cool mold cavity
2. heating and closing the mold and radial molding it to a final shape
3. cooling down the mold
4. opening the mold
5. moving the continuous preform equally or less than the length of the mold cavity in the direction of the common longitudinal axis
6. heating and closing the mold and radial molding it to final shape
7. cooling down the mold
8. opening the mold
9. repeating the steps 5-8 as many times as required to compress the whole length of the preform The outcome is a continuous radially molded article having desired fiber orientation and shape.

Figure 3:
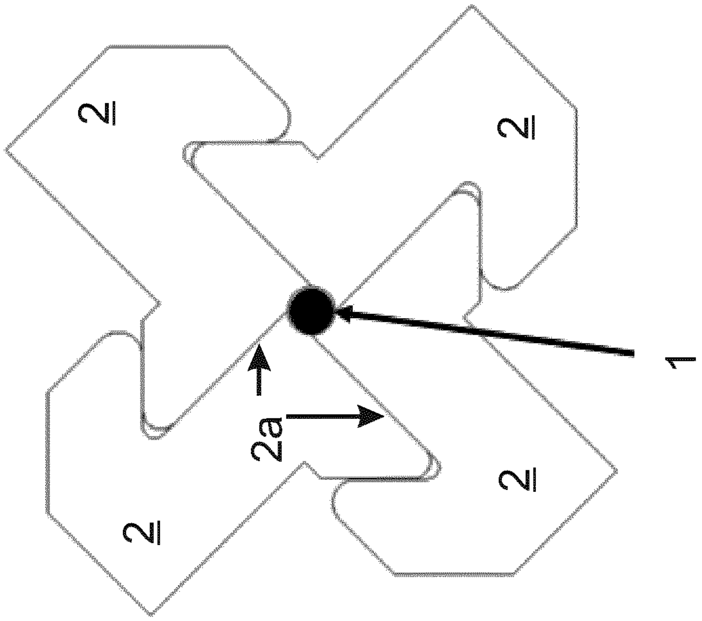
FIGS. 2 and 3 illustrate exemplary die segments.

In yet another embodiment, before the molding step, the method further comprises sliding at least one piston with specifically designed mold sealing feature at the distal end of the piston along the common longitudinal axis of the preform to further facilitate mold sealing. The sealing feature stops at the edge of the mold cavity. In this context, the piston includes a geometrical feature which seals the mold at the stage where mold cavity is "open" (FIG. 2) before the die segments move to the compressed position (FIG. 3). On such embodiment the separate actuator may move the piston or both pistons.

Figure 2:
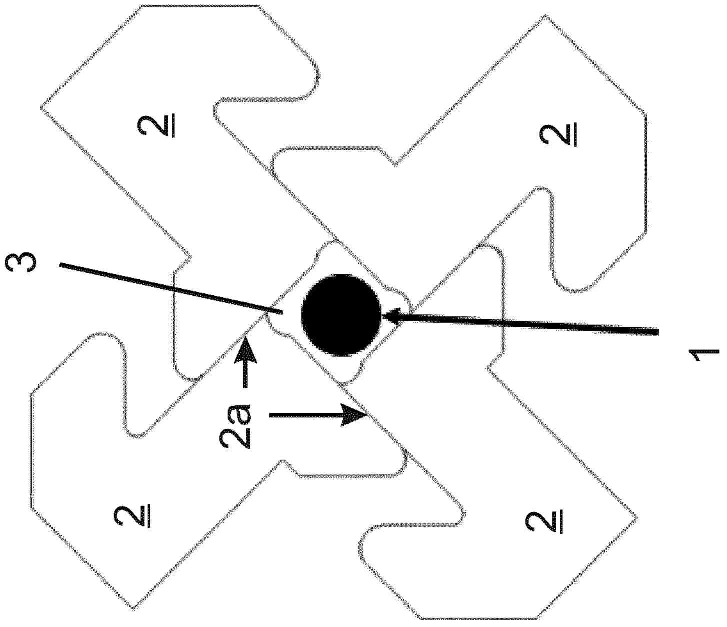

FIGS. 2 and 3 illustrate exemplary die segments 2 of a radial molding apparatus viewed along a longitudinal axis in an initial position and a compressed position, respectively. As shown in FIGS. 2 and 3, the apparatus comprises four die segments 2 forming a mold cavity 3. The die segments 2 can be similar or different depending on the manufactured product. Each die segment 2 comprises two interface surfaces 2*a* forming a wedge, which are in contact with interface surfaces 2*a* of adjacent die segments 2 all the time during an initial position (FIG. 2), molding step and compressed position (FIG. 3) and during movements between the positions. The die segments 2 can move along linear path which the interface surfaces 2*a* between the adjacent die segments 2 can be linear.

Figure 4:
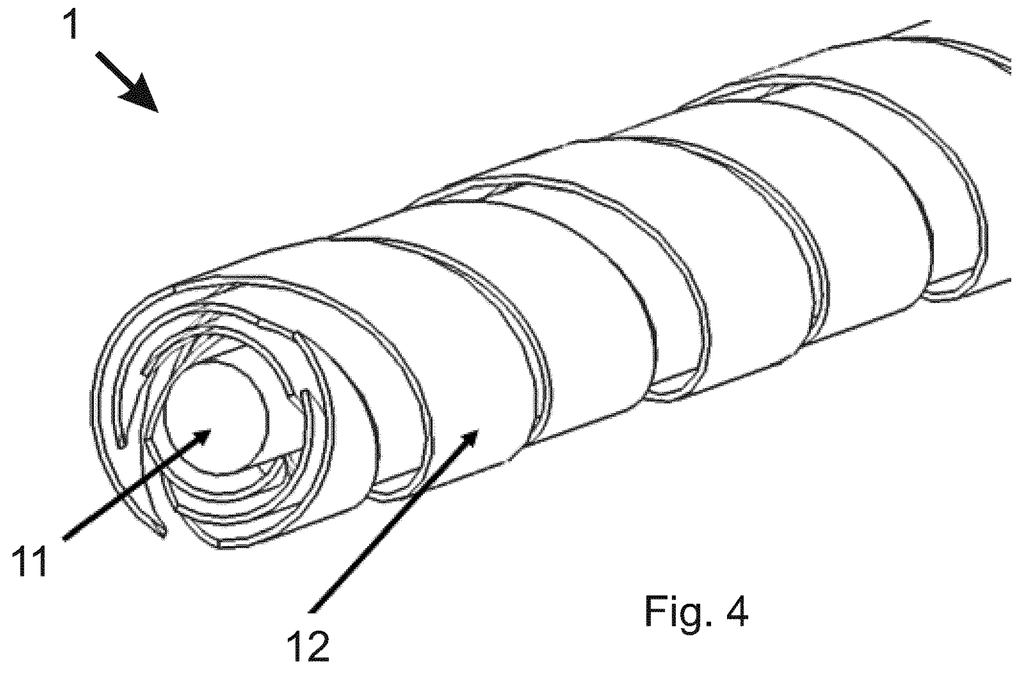
FIG. 4 illustrates an exemplary composite preform.

FIG. 4 illustrates an exemplary composite preform 1 comprising thermoplastic polymer matrix and reinforcing fibers. The preform 1 comprises a core 11 having uniaxial fiber orientation and plurality surrounding fiber layers 12 having a substantially 45° helix orientation. The helix orientation may be either or both right hand or/and left hand. The layers 12 may be overlapped with 45°/−45°/45°/−45°/45° etc. helix orientation, for example. The layers 12 may overlap with different or same helix orientation from the core 11 to the surface, wherein the fibers of the core 11 comprise same orientation parallel to the longitudinal axis. In some examples, the layers 12 may have same helix orientation close to the core 11 and different helix orientation close to the surface. The continuous reinforcing fibers are arranged to follow or conform to a surface design of finished article. In screws especially, the helix angle is essential for determining torque. Screw efficiency is controlled by the helix angle, and the maximum efficiency is between 40 and 45 degrees. However, in some embodiments, the helix orientation can be substantially or 30° or parallel to the longitudinal axis. The fiber insert 11 may also be replaced with a different material.

Figures 5A, 5B:
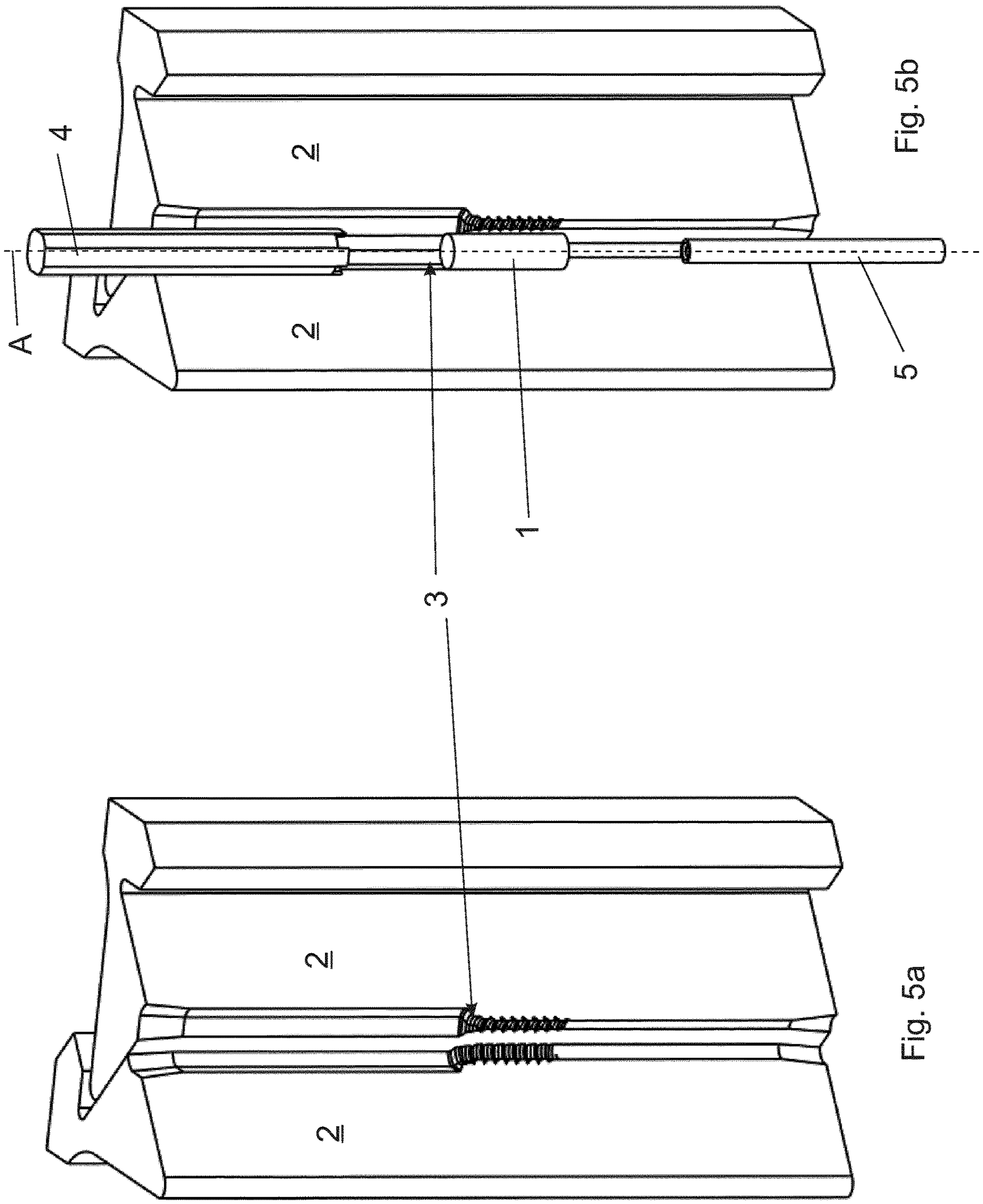
FIGS. 5*a*-5*f* illustrate a series of exemplary manufacturing steps with pistons.

FIGS. 5*a*-5*f* illustrate a series of exemplary manufacturing steps comprising similar die segments from FIGS. 2 and 3 with pistons 4, 5 in open views, wherein two front adjacent die segments 2 are not shown. FIG. 5*a* illustrates the die segments 2 in the initial position, wherein a mold cavity 3 has an initial volume. The mold cavity 3 in this example has a shape of a threaded screw. Above and below the mold cavity 3 are paths for pistons.

Figure 6:
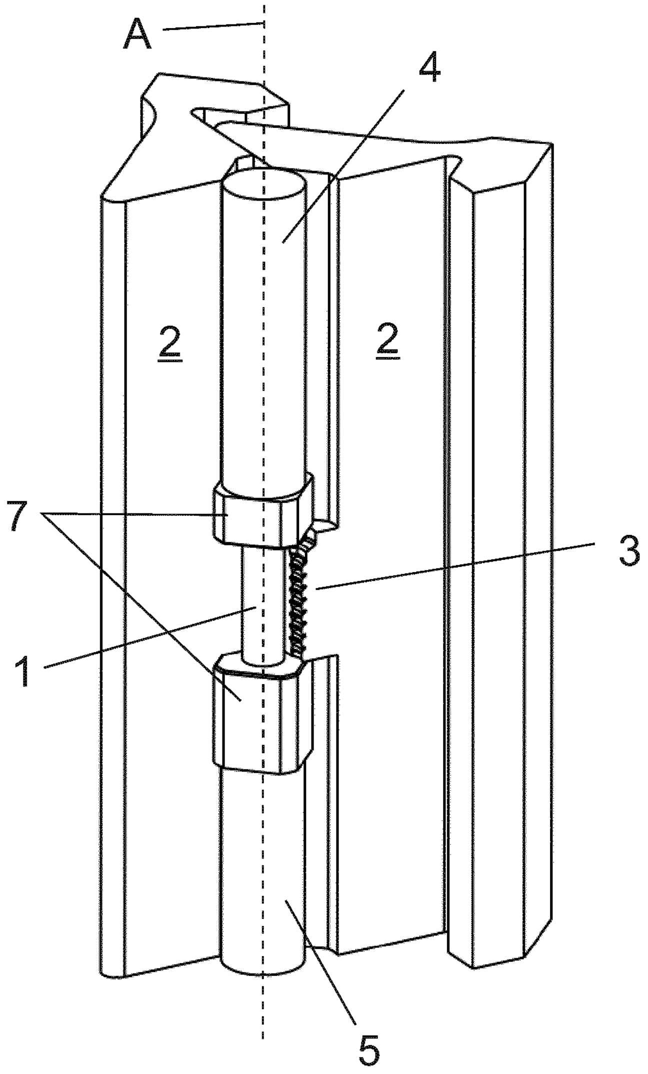
FIG. 6 illustrates an alternative step of the exemplary manufacturing step.

FIG. 5*b* illustrates the die segments 2 and pistons 4, 5 in initial positions, wherein a preform 1, having an initial shape and volume and comprising thermoplastic polymer matrix and reinforcing fibers, has been loaded inside the mold cavity 3. The preform 1 has a common longitudinal axis A which is perpendicular to compression. The initial volume of the preform 1 can be smaller than the initial volume of the mold cavity 3, and in a compressed position the mold cavity 3 and a finished article has a matching volume. The first piston 4 and the second piston 5 may have different diameter and shape but they may also have same diameter (as shown in FIG. 6). The pistons 4, 5 can be made of metal or metal with plastic tip such as PEEK.

Figure 5D:
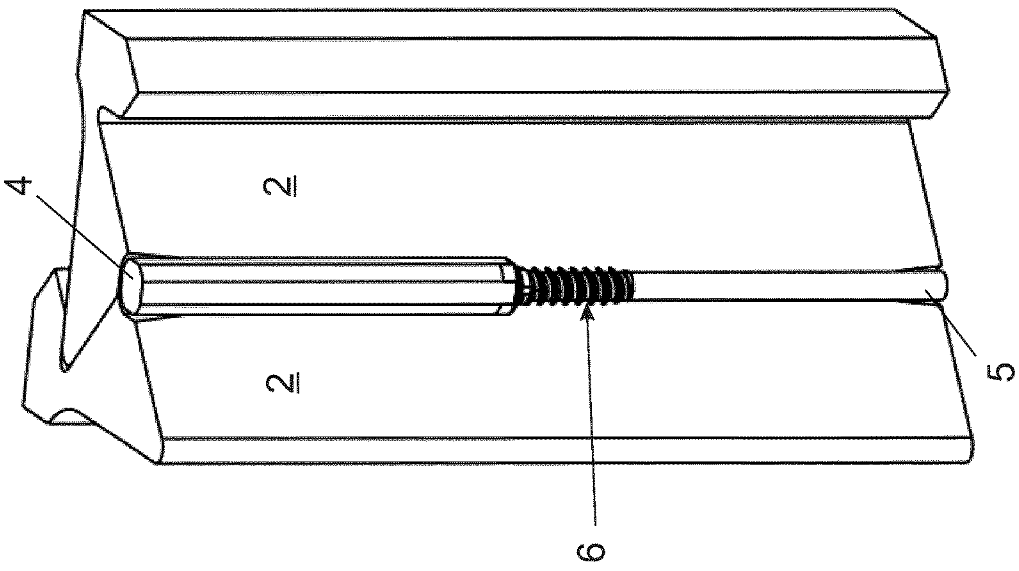
Figure 5C:
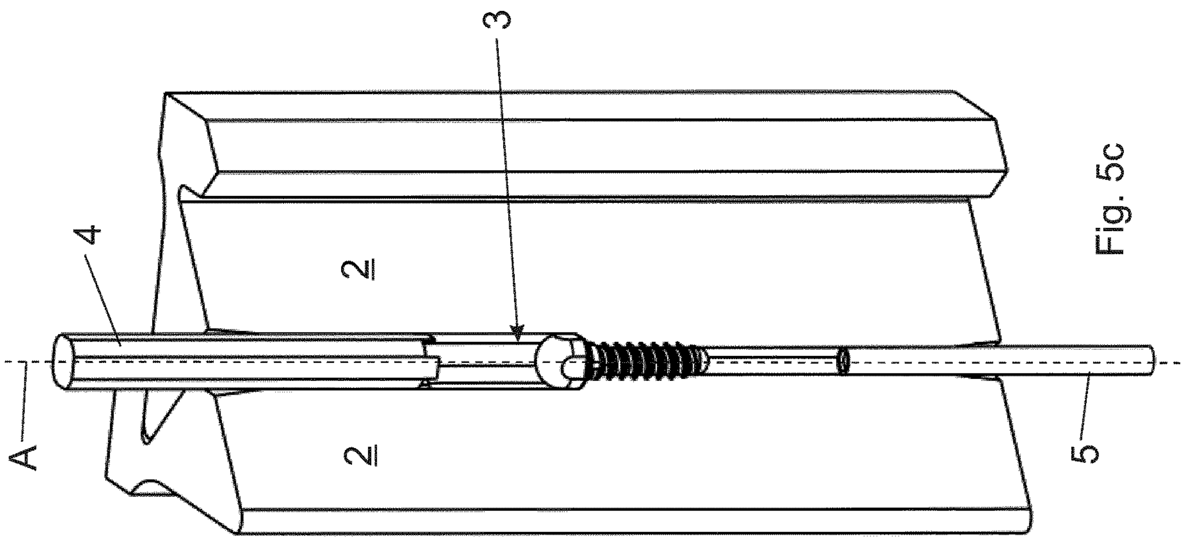

FIG. 5*c* illustrates a step, wherein the die segments 2 are at the compressed position while the pistons 4, 5 are still at the initial position. During radial compression, longitudinal shape of the preform 1 is formed and having a tailored fiber orientation wherein the continuous reinforcing fibers follow or conform to the surface contour. As seen from FIG. 5*c*, both end sections have a protrusion with non-controlled shape (shown as round shape in FIG. 5*c*), which may not be a desired design.

FIG. 5*d* illustrates the complete compressed position, wherein both pistons 4, 5 have slid inside the mold cavity 3 after the radial compression. The volume of the mold cavity 3 in the compressed position equals to the volume of the finished article 6. The first piston 4, and/or the second piston 5, has a distal end, which is the end contacting the preform 1 or unfinished article, that functions as a mold with an inverse design which is reproduced at an end portion of the finished article 6.

Figure 5F:
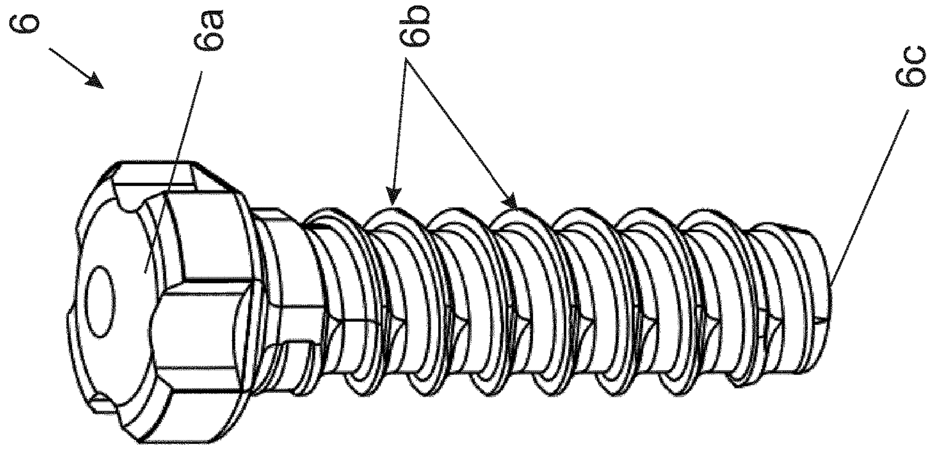
Figure 5E:
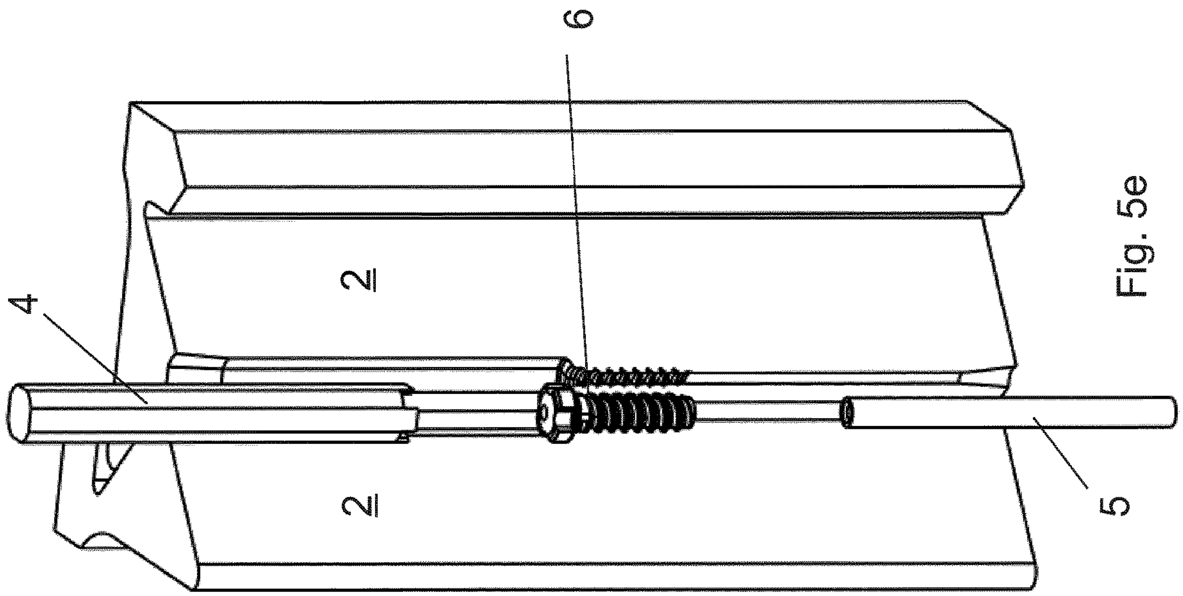

FIG. 5*e* illustrates the step, where the die segments 2 and pistons 4 and 5 are returned to the initial position and the finished article 6 is ready to be removed.

FIG. 5*f* illustrates a closer view of the finished article 6, which can be divided into the end portion 6*a*, middle portion 6*b* and tip portion 6*c*. The end portion 6*a* has a top shape which is formed by the first piston 4. The middle portion 6*b* has the helix threads which have the tailored fiber orientation with optimized mechanical properties. The tip portion 6*c* can be flat or, in some embodiments, include a tip made of other material than the preform 1. It may be fully threaded or partially threaded or smooth.

FIG. 6 illustrates an alternative step of the exemplary manufacturing steps. The embodiment of FIG. 6 is very similar to the one explained in connection with FIG. 5*c*. Therefore, the embodiment of FIG. 6 is in the following mainly explained by pointing out differences.

FIG. 6 illustrates a step before the radial compression, wherein the pistons 4, 5 are at the compressed position while the die segments 2 are still at the initial position (i.e. 5*b*). The pistons 4, 5 can either compress the end portion of the preform 1 to the desired design before radial compression or keep the preform 1 from flowing out of the mold cavity 3 during the radial compression while the radial compression pressure causes the preform 1 to push towards the pistons 4, 5 or both. In both cases the finished product is obtained having a tailored fiber orientation wherein the continuous reinforcing fibers follow or conform to the surface contour.

In a yet another embodiment, the piston 4, 5 may further comprise a sealing feature 7 at the interface of the mold cavity 3 along the common longitudinal axis A of the preform 1 to further facilitate mold sealing. The term "interface of the mold cavity 3" in this context refers to the border where the mold cavity 3 is defined by the final volume. The sealing feature 7 is shaped to seal the interface of at proximal and/or distal end of the mold cavity 3 when the die segments 2 are still at the initial position and arranged to focus and lock against rotation of the die segments 2 at the compressed position. The sealed interface at the end of the mold cavity 3 thus prevents leakage of moldable preform 1 to these directions and thus the sealed interfaces improve pressure regulation during the molding phase. When the sealing feature 7 is utilized, the diameter of the pistons 4, 5 may be smaller than the diameter of the mold cavity 3 in the compressed stage. The sealing feature 7 may be manufactured of any suitable sealant material such as rubber, metal or plastics such as PEEK. The sealing feature 7 may also be composed of same material as the rest of the pistons. The sealing feature 7 may also be a geometrical feature of the piston 4, 5, which is integrated or seamlessly joined to the piston 4, 5 and which is composed of any suitable material.

The invention claimed is:

1. A method of forming a fiber reinforced article comprising:

loading a composite preform inside a radial molding apparatus comprising at least three die segments at least partly forming a mold cavity having an initial volume in an initial position of the at least three die segments, adjacent ones of the at least three die segments being in direct contact in the initial position, the composite preform comprising a thermoplastic polymer matrix and a plurality of reinforcing fibers, and the composite preform having an initial volume and the plurality of reinforcing fibers having an initial fiber orientation;

molding the composite preform by moving the at least three die segments in a first direction perpendicularly to a common longitudinal axis of the composite preform from the initial position to a compressed position such that the initial volume of the mold cavity decreases and the die segments compress the composite preform to a form at least partly defined by the mold cavity in the compressed position of the at least three die segments, the at least three die segments remaining in direct contact with each other while moving from the initial position to the compressed position and when in the compressed position, wherein the mold cavity in the compressed position of the at least three die segments has a final volume that is smaller than or equal to the initial volume of the composite preform, before the at least three die segments are moved from the initial position or after the at least three die segments are moved to the compressed position, sliding at least one piston towards the composite preform inside the mold cavity along the common longitudinal axis of the composite preform to compress the composite preform and seal at least one end of the mold cavity, opening the mold cavity by moving the at least three die segments in a second direction opposite the first direction, and removing the fiber reinforced article from the mold cavity, the fiber reinforced article comprising a final fiber orientation different from the initial fiber orientation and in which the plurality of reinforcing fibers at least partly follow a surface contour of the fiber reinforced article.

2. The method of forming a fiber reinforced article according to claim 1, wherein the molding step comprises radial compression molding.

3. The method of forming a fiber reinforced article according to claim 2, comprising:

heating the composite preform to above glass transition temperature or melting temperature of thermoplastic polymer matrix inside the radial molding apparatus before or during the molding step or before loading the composite preform inside the radial molding apparatus; and cooling the composite preform during or after the molding step.

4. The method of forming a fiber reinforced article according to claim 1, wherein the molding step comprises injection molding, and where the fiber reinforced article is a fiber insert configured to be used as an insert in an overmolding process.

5. The method of forming a fiber reinforced article according to claim 1, wherein a distal end of the piston comprises a mold with an inverse design configured to be reproduced at an end portion of the fiber reinforced article.

6. The method of forming a fiber reinforced article according to claim 1, wherein the piston is configured to attach an insert or a metal or ceramic tip to the composite preform during the molding step.

7. The method of forming a fiber reinforced article according to claim 1, wherein the piston further comprises a seal configured to seal at an interface of the mold cavity when the piston is in the compressed position and/or during the molding step.

8. The method of forming a fiber reinforced article according to claim 1, wherein the initial volume of the composite preform is smaller than volume of the mold cavity in the initial position, and a transverse dimension of the composite preform in the initial position is larger than the transverse dimension of the fiber reinforced article in the compressed position.

9. The method of forming a fiber reinforced article according to claim 1, wherein during the molding step, each of the die segments moves an identical linear or curved displacement length along an adjacent one of the die segments, and the movements being synchronized by at least one actuator, and wherein the die segments are in direct contact with each other.

10. The method of forming a fiber reinforced article according to claim 1, wherein the initial fiber orientation of the composite preform is predetermined, wherein the composite preform comprises a fiber insert having a uniaxial fiber orientation and a plurality surrounding fiber layers having a helix orientation with any fiber angle.

11. The method of forming a fiber reinforced article according to claim 1, wherein the composite preform comprises an intermingled or interlocked layer structure.

12. The method of forming a fiber reinforced article according to claim 1, wherein the fiber reinforced article is a medical device.

* * * * *